(12) United States Patent
Matsumura et al.

(10) Patent No.: US 11,546,076 B2
(45) Date of Patent: Jan. 3, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 27 days.

(21) Appl. No.: 16/960,737

(22) PCT Filed: Jan. 11, 2018

(86) PCT No.: PCT/JP2018/000526
§ 371 (c)(1),
(2) Date: Jul. 8, 2020

(87) PCT Pub. No.: WO2019/138514
PCT Pub. Date: Jul. 18, 2019

(65) Prior Publication Data
US 2020/0344100 A1    Oct. 29, 2020

(51) Int. Cl.
*H04J 13/22* (2011.01)
*H01J 13/18* (2006.01)
(Continued)

(52) U.S. Cl.
CPC ............. *H04J 13/22* (2013.01); *H01J 13/18* (2013.01); *H04L 5/0051* (2013.01);
(Continued)

(58) Field of Classification Search
CPC ............. H04L 27/2613; H04L 27/2607; H04L 5/0053; H04L 5/001; H04L 5/0051;
(Continued)

(56) References Cited

U.S. PATENT DOCUMENTS

| | | | |
|---|---|---|---|
| 2014/0036850 A1* | 2/2014 | Akimoto | H04J 13/0062 370/329 |
| 2016/0156445 A1* | 6/2016 | Luo | H04L 5/0007 370/329 |

(Continued)

FOREIGN PATENT DOCUMENTS

| | | |
|---|---|---|
| JP | 2014-527354 A | 10/2014 |
| JP | 2016-219895 A | 12/2016 |
| WO | 2016/182063 A1 | 11/2016 |

OTHER PUBLICATIONS

International Search Report issued in Application No. PCT/JP2018/000526, dated Mar. 27, 2018 (4 pages).
(Continued)

*Primary Examiner* — Sharmin Chowdhury
(74) *Attorney, Agent, or Firm* — Osha Bergman Watanabe & Burton LLP

(57) ABSTRACT

A terminal is disclosed that includes a processor that determines a cyclic shift based on a cyclic shift index associated with an orthogonal cover code index configured by a higher layer and a transmitter that transmits on an uplink control channel, uplink control information to which an orthogonal cover code associated with the orthogonal cover code index is applied. The transmitter further transmits, within a resource block assigned for the uplink control channel, a demodulation reference signal using a reference signal sequence having the cyclic shift. In other aspects, a radio control method for a terminal and a base station are also disclosed.

6 Claims, 12 Drawing Sheets

| PRE-DFT OCC INDEX | 0 | 1 | 2 | 3 |
|---|---|---|---|---|
| INITIAL CS INDEX | 0 | 3 | 6 | 9 |

| PRE-DFT OCC INDEX | 0 | 1 | 2 | 3 |
|---|---|---|---|---|
| INITIAL CS INDEX | 0 | 6 | 3 | 9 |

(51) Int. Cl.
*H04L 27/26* (2006.01)
*H04W 72/04* (2009.01)
*H04L 5/00* (2006.01)

(52) U.S. Cl.
CPC ........ *H04L 27/261* (2013.01); *H04L 27/2607* (2013.01); *H04W 72/0413* (2013.01); *H04L 27/26025* (2021.01)

(58) Field of Classification Search
CPC ..... H04L 27/26; H01J 13/18; H04W 72/0413; H04J 13/004; H04J 13/0059; H04J 13/0074; H04J 13/22
See application file for complete search history.

(56) References Cited

U.S. PATENT DOCUMENTS

| | | | |
|---|---|---|---|
| 2017/0026955 | A1 | 1/2017 | Noh et al. |
| 2018/0152271 | A1* | 5/2018 | You .......................... H04L 1/08 |
| 2018/0198568 | A1 | 7/2018 | Takeda et al. |
| 2019/0007175 | A1* | 1/2019 | Kwak ................... H04L 5/0048 |
| 2019/0045499 | A1* | 2/2019 | Huang ............. H04W 72/0413 |
| 2019/0141698 | A1* | 5/2019 | Kim ................. H04W 72/0413 |
| 2019/0222254 | A1* | 7/2019 | Kim ...................... H04L 5/1469 |
| 2019/0342135 | A1* | 11/2019 | Kwak ................... H04L 1/1812 |

OTHER PUBLICATIONS

Written Opinion issued in International Application No. PCT/JP2018/000526,, dated Mar. 27, 2018 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Extended European Search Report issued in counterpart European Patent Application No. 18899656.5, dated Jul. 19, 2021 (11 pages).
Qualcomm Incorporated; "Long PUCCH design with more than 2 bits UCI payload"; 3GPP TSG RAN WG1 Meeting 91, R1-1721386; Reno, USA; Nov. 27-Dec. 1, 2017 (15 pages).
Huawei, HiSilicon; "Long PUCCH for UCI of up to 2 bits"; 3GPP TSG RAN WG1 Meeting #91, R1-1719394; Reno, USA; Nov. 27-Dec. 1, 2017 (6 pages).
CATT; "On design of long PUCCH formats for more than 2 UCI bits"; 3GPP TSG RAN WG1 Meeting 91, R1-1720198; Reno, USA; Nov. 27-Dec. 1, 2017 (6 pages).
Office Action in counterpart Japanese Patent Application No. 2019-564218 dated Feb. 22, 2022 (8 pages).
Office Action in counterpart Indian Patent Application No. 202037033020 dated Mar. 31, 2022 (6 pages).
Office Action in counterpart Japanese Patent Application No. 2019-564218 dated Aug. 16, 2022 (6 pages).

* cited by examiner

FIG. 2A

| PRE-DFT OCC INDEX | 0 | 1 | 2 | 3 |
|---|---|---|---|---|
| INITIAL CS INDEX | 0 | 3 | 6 | 9 |

FIG. 2B

| PRE-DFT OCC INDEX | 0 | 1 | 2 | 3 |
|---|---|---|---|---|
| INITIAL CS INDEX | 0 | 6 | 3 | 9 |

FIG. 2C

| PRE-DFT OCC INDEX | 0 | 1 | 2 | 3 |
|---|---|---|---|---|
| INITIAL CS INDEX | 0 | 6 | 9 | 3 |

FIG. 3A

PRE-DFT OCC LENGTH = 2

| PRE-DFT OCC INDEX | 0 | 0 | 1 | - | - |
|---|---|---|---|---|---|
| INITIAL CS INDEX | 0 | 0 | 6 | - | - |

FIG. 3B

PRE-DFT OCC LENGTH = 4

| PRE-DFT OCC INDEX | 0 | 0 | 1 | 2 | 3 |
|---|---|---|---|---|---|
| INITIAL CS INDEX | 0 | 0 | 3 | 6 | 9 |

| $j_{hop}$ | 0 | 1 | 2 | 3 |
|---|---|---|---|---|
| $k_l$ | 0 | 3 | 6 | 9 |

FIG. 4

| $j_{hop}$ | 0 | 1 | 2 | 3 |
|---|---|---|---|---|
| $m_l$ | 0 | 6 | 3 | 9 |

FIG. 5A

| $j_{hop}$ | 0 | 1 | 2 | 3 |
|---|---|---|---|---|
| $k_l$ | 0 | 6 | 9 | 3 |

PRE-DFT OCC LENGTH = 2

| $j_{hop}$ | 0 | 1 | - | - |
|---|---|---|---|---|
| $k_l$ | 0 | 6 | - | - |

FIG. 6B

PRE-DFT OCC LENGTH = 4

| $j_{hop}$ | 0 | 1 | 2 | 3 |
|---|---|---|---|---|
| $k_l$ | 0 | 3 | 6 | 9 |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, a PUCCH (Physical Uplink Control CHannel)) or an uplink data channel (for example, a PUSCH (Physical Uplink Shared CHannel)). The format of this uplink control channel is referred to as "PUCCH format (PF (PUCCH Format))" and/or the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, LTE Rels. 14, 15 and/or later versions, 5G, NR, etc.) are under study to support code multiplexing (Code Division Multiplexing (CDM)) of uplink control channels from a plurality of user terminals.

Also, studies are underway to use cyclic shift (CS) to code-multiplex uplink control channels. However, unless appropriate cyclic shift is used, the quality of uplink control channels may be degraded due to interference between user terminals and/or other factors.

The present invention has been made in view of the above, and it is therefore an object of the present invention to provide a user terminal and a radio communication method for improving the performance of uplink control channels that are code-multiplexed among a plurality of user terminals.

Solution to Problem

In accordance with one aspect of the present invention, a user terminal has a transmission section that transmits an uplink control channel, containing data, to which an orthogonal cover code is applied before discrete Fourier transform, and a demodulation reference signal, to which a cyclic shift is applied, and a control section that executes control so that the cyclic shift is determined based on an index of the orthogonal cover code, a time resource of the demodulation reference signal and a length of the orthogonal cover code or a maximum value of the length.

Advantageous Effects of Invention

According to the present invention, it is possible to improve the performance of uplink control channels that are code-multiplexed among a plurality of user terminals.

BRIEF DESCRIPTION OF DRAWINGS

FIGS. 2A to 2C are diagrams to show examples of associations between pre-DFT OCC indices and initial CS indices according to example 1-1 of the present invention;

FIGS. 3A and 3B are diagrams to show examples of associations between pre-DFT OCC indices and initial CS indices according to example 1-2 of the present invention;

FIG. 4 is a diagram to show examples of associations between CS hopping indices and CS indices;

FIGS. 5A and 5B are diagrams to show other examples of associations between CS hopping indices and CS indices;

FIGS. 6A and 6B are diagrams to show other examples of associations between CS hopping indices and CS indices according to example 2-2 of the present invention;

DESCRIPTION OF EMBODIMENTS

Existing LTE systems (LTE Rel. 13 and earlier versions) support uplink control channels (for example, PUCCHs) of multiple formats (for example, LTE PUCCH formats ("LTE PFs") 1 to 5 and/or others) of the same duration (for example, fourteen symbols when normal cyclic prefix (CP) is used).

In future radio communication systems (for example, LTE Rel. 15 and later versions, 5G, NR, etc.), a study is underway to transmit UCI using uplink control channels (for example, PUCCHs) of multiple formats (for example, NR PUCCH formats (NR PFs), which are also simply referred to as "PUCCH formats") with at least different durations.

Figure 1A:
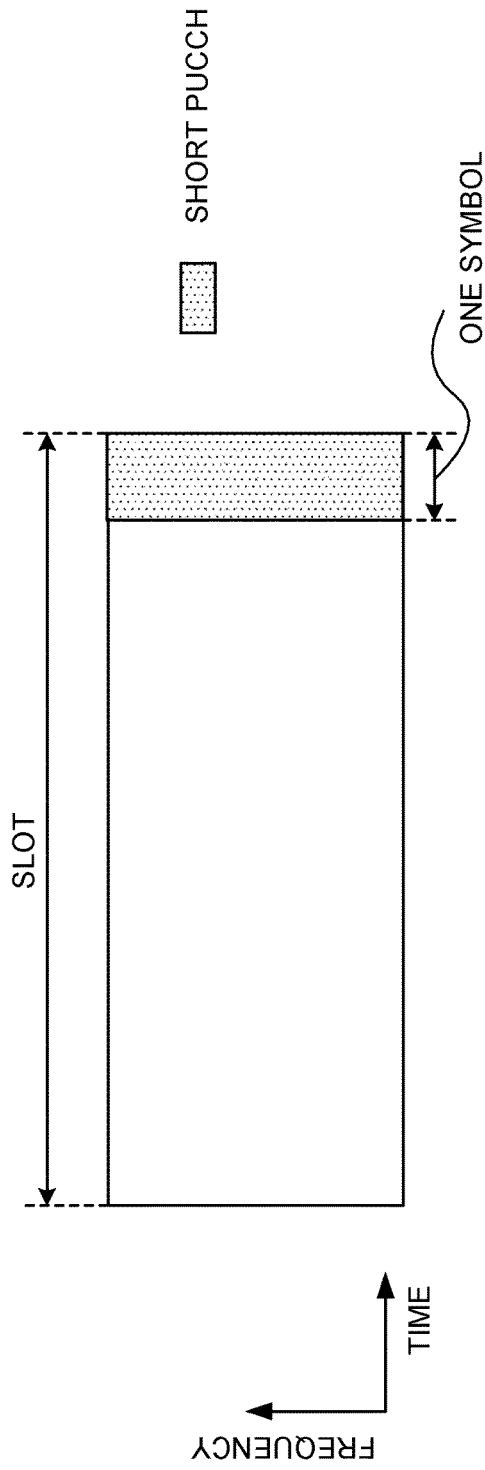
FIGS. 1A and 1B provide diagrams, each showing an example of the format of an uplink control channel in future radio communication systems.
Figure 1B:

FIG. 1 provide diagrams to show examples of PUCCHs in future radio communication systems. FIG. 1A shows a PUCCH (a short PUCCH or a first uplink control channel) that is comprised of a relatively small number of symbols (for example, to have a duration of one to two symbols). FIG. 1B shows a PUCCH (a long PUCCH or a second uplink control channel) that is comprised of a larger number of symbols than a short PUCCH (for example, to have a duration of four to fourteen symbols).

As shown in FIG. 1A, a short PUCCH may be arranged in a given number of symbols (here, one symbol) from the end of a slot. Note that the symbols for arranging a short PUCCH are not confined to the end of a slot, and a given number of symbols at the top or in the middle of a slot may be used as well. In addition, a short PUCCH is arranged in one or more frequency resources (for example, one or more PRBs (Physical Resource Blocks)). Note that, although the short PUCCH of FIG. 1A is placed in consecutive PRBs, the short PUCCH may be arranged in non-consecutive PRBs as well.

Also, a short PUCCH may be time-division-multiplexed and/or frequency-division-multiplexed with an uplink data channel (hereinafter also referred to as a "PUSCH") within a slot. Also, a short PUCCH may be time-division-multiplexed and/or frequency-division-multiplexed with a downlink data channel (hereinafter also referred to as a "PDSCH (Physical Downlink Shared CHannel)" and/or a downlink control channel (hereinafter also referred to as a "PDCCH (Physical Downlink Control CHannel)") within a slot.

For a short PUCCH, a multi-carrier waveform (for example, the OFDM (Orthogonal Frequency Division Multiplexing) waveform) may be used, or a single-carrier waveform (for example, the DFT-s-OFDM (Discrete Fourier Transform-Spread-Orthogonal Frequency Division Multiplexing) waveform) may be used.

On the other hand, as shown in FIG. 1B, a long PUCCH is arranged over a larger number of symbols (for example, four to fourteen symbols) than a short PUCCH. Referring to FIG. 1B, this long PUCCH is not arranged in a given number of symbols at the top of the slot, but can be arranged in a given number of symbols at the top.

As shown in FIG. 1B, a long PUCCH may be comprised of fewer frequency resources (for example, one or two PRBs) than a short PUCCH so as to achieve a power boosting effect, or may be comprised of frequency resources equal to the short PUCCH.

Also, a long PUCCH may be frequency-division-multiplexed with a PUSCH in a slot. In addition, a long PUCCH may be time-division-multiplexed with a PDCCH in a slot. Also, a long PUCCH may be arranged with a short PUCCH in the same slot. For a long PUCCH, a single-carrier waveform (for example, DFT-s-OFDM waveform) may be used, or a multi-carrier waveform (for example, OFDM waveform) may be used.

Also, as in FIG. 1B, frequency hopping, in which the frequency resource hops at a given timing within a slot may be applied to a long PUCCH. The timing at which the frequency resource hops in a long PUCCH may be referred to as the "hopping boundary," the "hopping timing," the "hopping pattern," and so on.

In future radio communication systems, a plurality of PUCCH formats (NR PUCCH formats), where one of the number of symbols, the number of UCI bits and UE multiplexing varies, are under study. Note that PUCCH formats 0 to 4 are simply examples, and the contents and the index numbers of PUCCH formats are not limited to those shown below.

For example, PUCCH format 0 is a short PUCCH for UCI of up to two bits (see, for example, FIG. 1A), and is also referred to as a "sequence-based short PUCCH" and so on. The short PUCCH conveys UCI (for example, HARQ-ACK and/or scheduling request (SR)) of up to two bits using one symbol or two symbols.

PUCCH format 1 is a long PUCCH for UCI of up to two bits (see, for example, FIG. 1B). This long PUCCH conveys UCI of up to two bits using four to fourteen symbols. In PUCCH format 1, for example, multiple user terminals may be code-division-multiplexed (CDM) in the same PRB by time-domain block-wise spreading, which uses cyclic shift (CS) and/or orthogonal cover code (OCC (Orthogonal Cover Code)).

PUCCH format 2 is a short PUCCH for UCI of more than two bits (see, for example, FIG. 1A). This short PUCCH conveys more than two bits of UCI in one or two symbols.

PUCCH format 3 is a long PUCCH for UCI exceeding two bits (for example, FIG. 1B). This long PUCCH conveys more than two bits of UCI in four to fourteen symbols. Also, in PUCCH format 3, OCC before DFT spreading (pre-DFT OCC) needs not be applied.

PUCCH format 4 is a long PUCCH for UCI of more than two bits (see, for example, FIG. 1B), and a single user terminal is multiplexed in the same PRB. The long PUCCH conveys UCI of more than two bits. Pre-DFT OCC may be applied to data symbols in PUCCH format 4. CS may be applied to DMRS (DeModulation Reference Signal) symbols in PUCCH format 4. By using varying pre-DFT OCCs and/or CSs, it is possible to code-division-multiplex (CDM) PUCCHs of a plurality of user terminals.

When the number of subcarriers in one PRB is twelve, CS represents one of twelve phase rotations ($\pi/6$, $2\pi/6$, and so on), which are obtained by dividing $2\pi$ into twelve equal portions, and is represented by one of CS indices 0 to 11. The DMRS sequence may be a CAZAC (Constant Amplitude Zero Auto-Correlation) sequence (for example, a Zadoff-Chu sequence), may be a sequence conforming to a CAZAC sequence (CG-CAZAC (Computer-Generated CAZAC) sequence) such as one that is provided in the tables, or may be a pseudo random sequence (for example, Gold sequence).

In PUCCH format 4, study is in progress to set the index of initial CS (initial CS index) to apply to DMRS to one of 0, 3, 6 and 9, out of 0 to 11. Initial CS is the CS to serve as a base, and, for example, equivalent to the CS in slot number 0, OFDM symbol number 0, and so on. Note that DMRS may not be transmitted in slot number 0 and OFDM symbol number 0.

For PUCCH format 4, a study is underway to make the index of pre-DFT OCC (pre-DFT OCC index) one of 0, 1, 2 and 3, and specify this using higher layer signaling (for example, RRC (Radio Resource Control) signaling).

Furthermore, PUCCH format 4 is under study so that the pre-DFT OCC length is either two or four, and indicated based on higher layer signaling (for example, RRC signaling). If the pre-DFT OCC length is two, PUCCHs of up to two UEs are code-division-multiplexed (CDM) using two pre-DFT OCCs. If the pre-DFT OCC length is four, PUCCH of four UEs are code-division-multiplexed (CDM) using up to four OCCs.

Also, CS hopping to change CS for each symbol in long PUCCH has been studied.

However, as in PUCCH format 4, how to determine the CS when only limited CSs are available for use is not yet decided.

The present inventors have studied how the UE determines CS based on pre-DFT OCC in PUCCH format 4 and arrived at the present invention. For example, the UE performs CS hopping based on pre-DFT OCC.

Now, the present embodiment will be described below in detail. In the following description, a method for determining CS to apply to DMRS in PUCCH format 4 will be described. This determination method may be applied to CS in other PUCCH formats.

A UE may transmit a PUCCH that includes data, to which OCC is applied prior to DFT spreading (pre-DFT OCC), and a DMRS, to which a CS is applied. The UE may determine the CS based on the pre-DFT OCC index, the time resources of the DMRS (for example, the slot number and the symbol number), and the pre-DFT OCC length or the maximum value of the pre-DFT OCC length. The UE and the network (for example, a radio base station) determine the CS using this determination method, so that multiple UEs can use different CSs.

In PUCCH resource 4, the same time resources and the same frequency resources may be configured for PUCCHs for a plurality of UEs. The total number of CSs may be the number of subcarriers in a PRB. The number of CSs that can be used in PUCCH format 4 may be limited. The pre-DFT OCC length may be applied, or the maximum value of pre-DFT OCC length may be applied. The CS indices that can be used in PUCCH format 4 may be provided at two or more given intervals.

First Example

In accordance with a first example of the present invention, a method will be described below by which, in PUCCH format 4, a UE determines the initial CS index for a DMRS by using a pre-DFT OCC index.

A PUCCH resource to contain a pre-DFT OCC index (for channel quality information (CQI), a scheduling request (SR) and so on, for example) may be (semi-statically) configured via higher layer signaling (for example, via RRC signaling).

A PUCCH resource set (for HARQ-ACK, for example) containing pre-DFT OCC indices may be preconfigured by higher layer signaling (for example, RRC signaling), and one PUCCH resource in this PUCCH resource set may be configured by a specific field in downlink control information (DCI)) and/or based on implicit rules. For example, according to implicit rules, the UE may determine PUCCH resources associated with the CCE (Control Channel Element) indices of the PDCCH, or determine PUCCH resources associated with the PRB indices of the PDSCH.

Example 1-1

Regardless of the pre-DFT OCC length, the same rule (for example, a table) may be applied.

Associations between pre-DFT OCC indices and initial CS indices for DMRSs may be configured in advance. For example, one of the tables in FIGS. 2A to 2C may be provided in the specification.

In the event the table of FIG. 2A is used and the pre-DFT OCC length is two, a first UE uses pre-DFT OCC index 0 and initial CS index 0, and a second UE uses pre-DFT OCC index 1 and initial CS index 3. In this case, there is an interval (distance) of three between the initial CS index of the first UE and the initial CS index of the second UE.

In the event the table of FIG. 2B or 2C is used and the pre-DFT OCC length is two, the first UE uses pre-DFT OCC index 0 and initial CS index 0, and the second UE uses pre-DFT OCC index 1 and initial CS index 6. In this case, there is an interval of six between the initial CS index of the first UE and the initial CS index of the second UE.

Thus, the interval between the initial CSs of two UEs in the event FIG. 2B or 2C are used is greater than the distance when FIG. 2A is used. In this way, by increasing the interval between the initial CSs of two UEs, it is possible to improve the robustness against frequency-selective channels and to improve the performance of PUCCHs. Therefore, it is preferable to maximize the interval between the initial CSs of two UEs as in FIG. 2B or 2C.

As shown in FIG. 2B or 2C, if the interval between two initial CS indices corresponding to pre-DFT OCC indices 0 and 1 is the maximum, a table in which the order of these initial CS indices is switched may be used.

The UE obtains initial CS indices from pre-DFT OCC indices using one rule regardless of the pre-DFT OCC length so that UE operation is simplified and the cost of UEs can be reduced.

Example 1-2

Different rules (for example, a table) may be applied depending on the pre-DFT OCC length.

For each pre-DFT OCC length, associations between pre-DFT OCC indices and initial CS indices for DMRSs may be configured in advance. For example, a table for use when the pre-DFT OCC length is two as in FIG. 3A and a table when the pre-DFT OCC length is four as in FIG. 3B may be provided in the specification.

As shown in FIG. 3A, the interval between two initial CSs when the pre-DFT OCC length is two may be longer than the interval between two initial CSs when the pre-DFT OCC length is four. In this way, by increasing the interval between the initial CSs of two UEs, it is possible to improve the robustness against frequency-selective channels and to improve the performance of PUCCHs. Consequently, it is preferable to maximize the interval between the initial CSs of two UEs, as shown in FIGS. 3A and 3B.

As shown in FIG. 3A, if the interval between two initial CS indices is the maximum, a table to contain other initial CS indices (3 and/or 9) may be used.

The UE and the network (for example, a radio base station) determine initial CS indices from pre-DFT OCC indices, by using the first example, so that a plurality of UEs can use different pre-DFT OCCs and different initial CSs.

Second Example

While CS hopping for when the CS index is 0 to 11 is under study, but CS hopping for when the CS index is limited to 0, 3, 6 and 9 is not studied. Now, in accordance with a second example of the present invention, a method by which a UE controls CS hopping for DMRSs in PUCCH format 4 will be described.

Studies on CS hopping using CS indices 0 to 11 are underway. However, if the CS indices that can be used in PUCCH format 4 are limited to 0, 3, 6 and 9, the method of CS hopping needs to be changed.

The UE controls CS hopping based on pre-DFT OCC indices.

CS index $k_l$ may change as a function of the slot number and the symbol number. For example, CS hopping index $j_{hop}$ is given by equation 1. For example, according to the table of FIG. 4, CS index $k_l$ is given from CS hopping index $j_{hop}$. For example, if the CS hopping indices are 0, 1, 2 and 3, the CS indices are 0, 3, 6 and 9, respectively.

$$j_{hop}=(m_0+m_{cs}+n_{cs}(n_s,l+l')) \bmod N_{hop}^{pre\text{-}DFT} \qquad \text{(Equation 1)}$$

Here, $N_{hop}^{pre\text{-}DFT}$ is the number of pre-DFT OCCs that can be used, and, for example, two or four. $n_s$ is the slot number in the radio frame. l is the OFDM symbol number in PUCCH transmission. l=0 corresponds to the first OFDM symbol in PUCCH transmission. l' is the index of the OFDM symbol in the slot, and corresponds to the first OFDM symbol in PUCCH transmission. $m_0$ is the initial CS index that is given in accordance with the first example. Since $m_{cs}=0$ in PUCCH format 3 or 4, $m_{cs}$ may be removed from equation 1. $n_{cs}$ ($n_s$, l) is given by equation 2.

$$n_{cs}(n_s,l)=\Sigma_{m=0}^{7} 2^m c(14 \cdot 8 n_s + 8l + m) \qquad \text{(Equation 2)}$$

The pseudo-random sequence generator of pseudo-random sequence c(i) is initialized by $c_{init}=n_{ID}$ when each radio frame starts. $n_{ID}$ is configured with one of 0 to 1023 by higher layer signaling (for example, RRC signaling), or, otherwise, the cell ID.

$\alpha_l$, which is the CS to correspond to CS index $k_l$, is given by following equation 3:

$$\alpha_l = \frac{2\pi}{N_{sc}^{RB}} k_l \qquad \text{(Equation 3)}$$

Figure 4:
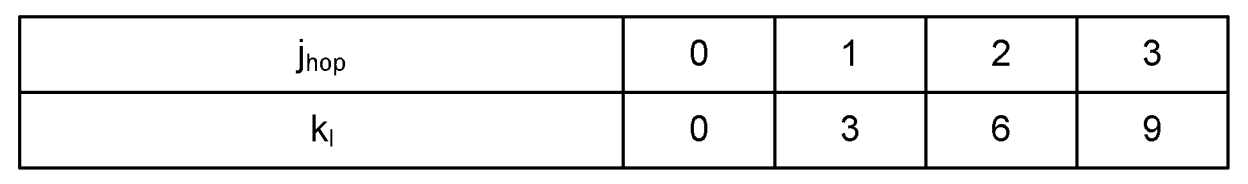
Figures 5A, 5B:
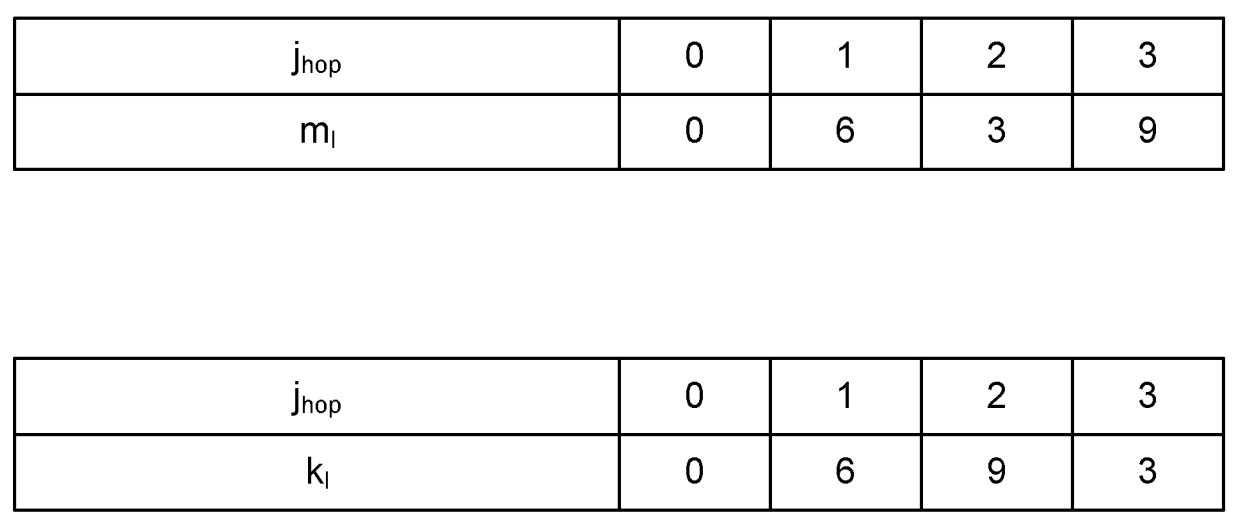

Instead of the table of FIG. 4, the table of FIG. 5A or 5B may be used. According to the table of FIG. 5A, when the CS hopping indices are 0, 1, 2 and 3, the CS indices are 0, 6, 3 and 9, respectively. According to the table of FIG. 5A, when the CS hopping indices are 0, 1, 2 and 3, the CS indices are 0, 6, 9 and 3, respectively.

When the table of FIG. 5 is used and the pre-DFT OCC length is two, there is an interval of three between the CS indices of two UEs. On the other hand, when the table of FIG. 5A or 5B is used and the pre-DFT OCC length is two, there is an interval of six between the CS indices of two UEs.

According to the table of FIG. 5A or 5B, the interval between CSs for UEs that are multiplexed can be increased. By this means, improved link level performance can be achieved. As shown in the table of FIG. 5A or 5B, when the interval between two CS indices corresponding to CS hopping indices 0 and 1 respectively is the maximum, a table in which the order of CS indices is switched may be used.

$N_{hop}^{pre\text{-}DFT}$ may be determined according to one of the following example 2-1 and example 2-2.

Example 2-1

$N_{hop}^{pre\text{-}DFT}$ may be configured by the specification in advance. That is, irrespective of pre-DFT OCC length, $N_{hop}^{pre\text{-}DFT}$ may be four.

The availability of CS indices can be increased. By means of this configuration, randomization gain can be achieved in some cases. Furthermore, by means of this configuration, inter-cell interference can be suppressed in some cases.

Example 2-2

$N_{hop}^{pre\text{-}DFT}$ may be the pre-DFT OCC length.

Appropriate CS hopping can be performed by changing the range of CS hopping indices and CS indices depending on the pre-DFT OCC length.

The table of FIG. 4 may be used, or different tables may be used depending on the pre-DFT OCC length. For example, CS index $k_l$ is given from CS hopping index $j_{hop}$ according to the table of FIG. 6A when the pre-DFT OCC length is two, and CS index $k_l$ is given from CS hopping index $j_{hop}$ according to the table of FIG. 6B when the pre-DFT OCC length is four.

When the table of FIG. 6A is used, the interval between the CS indices of two UEs is six.

According to the tables of FIGS. 6A and 6B, the interval between CSs for UEs that are multiplexed can be increased. This can improve link level performance. As shown in the table of FIG. 6A, if the interval between CS indices is the maximum, a table containing other CS indices (3 and/or 9) may be used.

The UE and the network (for example, a radio base station) determine CS indices that have been subjected to CS hopping, from pre-DFT OCC indices, by using the second example, so that a plurality of UEs can perform CS hopping by using varying CSs. Furthermore, by determining CS indices based on the pre-DFT OCC length or the maximum value of the pre-DFT OCC length, the number of CS indices can be kept at the pre-DFT OCC length or the pre-DFT OCC length, and the interval between CSs can be secured.

Third Example

Depending on which table is used in the second example, cases might occur where the interval between the CS indices of two UEs to be multiplexed may not be maximized. In accordance with a third example of the present invention, a method for maximizing the interval between CS indices for two UEs to be multiplexed will be described.

Instead of equation 1 in the second example, equation 4 below is used.

$$j_{hop}=(n_0+((m_{cs}+n_s(n_s,l+l')) \bmod N_{hop}^{pre\text{-}DFT})) \bmod N_{hop}^{pre\text{-}DFT} \qquad \text{(Equation 4)}$$

Equation 4 uses $n_0$ instead of $m_0$. $n_0$ is the pre-DFT OCC index. When the pre-DFT OCC length is two, then $n_0=\{0, 1\}$, and, when the pre-DFT OCC length is four, $n_0=\{0, 1, 2, 3\}$.

A PUCCH resource to contain a pre-DFT OCC index (for channel quality information (CQI), a scheduling request (SR) and so on, for example) may be (semi-statically) configured via higher layer signaling (for example, via RRC signaling).

A PUCCH resource set (for HARQ-ACK, for example) containing pre-DFT OCC indices may be preconfigured by higher layer signaling (for example, RRC signaling), and one PUCCH resource in this PUCCH resource set may be configured by a specific field in downlink control information (DCI)) and/or based on implicit rules. For example, according to implicit rules, the UE may determine PUCCH resources associated with the CCE (Control Channel Element) indices of the PDCCH, or determine PUCCH resources associated with the PRB indices of the PDSCH.

For example, according to the table of FIG. 4, CS index $k_l$ is given from CS hopping index $j_{hop}$.

$α_l$, which is the CS corresponding to CS index $k_l$, is given by equation 3.

Instead of equation 4, equation 5 below can be used.

$$j_{hop} = (n_0 + m_{cs} + n_{cs}(n_s, l + l')) \bmod N_{hop}^{pre-DFT} \quad \text{(Equation 5)}$$

Example 3-1

$N_{hop}^{pre-DFT}$ may be configured by the specification in advance. That is, irrespective of the pre-DFT OCC length, $N_{hop}^{pre-DFT}$ may be four.

The availability of CS indices can be increased. By means of this configuration, randomization gain can be achieved in some cases. Furthermore, by means of this configuration, inter-cell interference can be suppressed in some cases.

Example 3-2

$N_{hop}^{pre-DFT}$ may be the pre-DFT OCC length.

Appropriate CS hopping can be performed by changing the range of CS hopping indices and CS indices depending on the pre-DFT OCC length.

Instead of the table of FIG. 4, the table of FIG. 5A or 5B may be used. According to the table of FIG. 5A, when the CS hopping indices are 0, 1, 2 and 3, the CS indices are 0, 6, 3 and 9, respectively. According to the table of FIG. 5A, when the CS hopping indices are 0, 1, 2 and 3, the CS indices are 0, 6, 9 and 3, respectively.

When the table of FIG. 4 is used and the pre-DFT OCC length is two, there is an interval of three between the CS indices of two UEs. On the other hand, when the table of FIG. 5A or FIG. 5B is used and the pre-DFT OCC length is two, there is an interval of six between the CS indices of two UEs.

According to the table of FIG. 5A or 5B, the interval between CSs for UEs that are multiplexed can be increased. By this means, improved link level performance can be achieved. As shown in the table of FIG. 5A or 5B, when the interval between two CS indices corresponding to CS hopping indices 0 and 1 respectively is the maximum, a table in which the order of CS indices is switched may be used.

Instead of the table of FIG. 4, different tables may be used depending on the pre-DFT OCC length. For example, if the pre-DFT OCC length is two, CS index $k_l$ is given from CS hopping index $j_{hop}$ according to the table in FIG. 6A, and, when the pre-DFT OCC length is four, CS index $k_l$ is given from CS hopping index $j_{hop}$ according to the table in FIG. 6B.

When the table of FIG. 6A is used, the interval between the CS indices of two UEs is six.

According to the tables of FIGS. 6A and 6B, the interval between CSs for UEs that are multiplexed can be increased. This can improve link level performance. As shown in the tables of FIGS. 6A and 6B, if the interval between CS indices is the maximum, a table containing other CS indices may be used.

The UE and the network (for example, a radio base station) determine CS indices that have been subjected to CS hopping, from pre-DFT OCC indices, by using the third example, so that a plurality of UEs can perform CS hopping by using varying CSs. Furthermore, by determining CS indices based on the pre-DFT OCC length or the maximum value of the pre-DFT OCC length, the number of CS indices can be kept at the pre-DFT OCC length or the pre-DFT OCC length, and the interval between CSs can be secured.

Fourth Example

In accordance with a fourth example of the present invention, a method for controlling CS hopping for DMRSs in PUCCH format 3 or PUCCH format 4 based on equations will be described.

For example, $α_l$, which is the CS obtained by CS hopping, is given by equation 6 below.

$$α_l = \frac{2\pi}{N_{hop}^{pre-DFT}} (n_0 + (m_{cs} + n_{cs}(n_s, l + l'))) \bmod N_{hop}^{pre-DFT} \quad \text{(Equation 6)}$$

By removing $2\pi/N_{hop}^{pre-DFT}$ in equation 6, equation 6 may represent CS index ($k_l$), instead of representing $α_l$. In this case, $α_l$ is $\{1, 2, \ldots, N_{hop}^{pre-DFT}-1\}$.

Example 4-1

$n_0$ is given by following equation 7:

$$n_0 = \begin{cases} 0 & PUCCH \text{ format 3} \\ 0 & PUCCH \text{ format 4 with } n_{oc} = 0 \\ N_{hop}^{pre-DFT}/2 & PUCCH \text{ format 4 with } n_{oc} = 1 \\ N_{hop}^{pre-DFT}/4 & PUCCH \text{ format 4 with } n_{oc} = 2 \\ N_{hop}^{pre-DFT}*3/4 & PUCCH \text{ format 4 with } n_{oc} = 3 \end{cases} \quad \text{(Equation 7)}$$

Equation 7 corresponds to the case in which the table of FIG. 5A of example 3-1 is used. Also, equation $n_{oc}=2$ and equation $n_{oc}=3$ in equation 7 may be switched, so as to provide an equation to support the case where the table of FIG. 5B of example 3-1 is used.

Example 4-2

$n_0$ varies depending on $N_{hop}^{pre-DFT}$

If $N_{hop}^{pre-DFT}$ is two, $n_0$ is given by following equation 8:

$$n_0 = \begin{cases} 0 & PUCCH \text{ format 3} \\ 0 & PUCCH \text{ format 4 with } n_{oc} = 0 \\ N_{hop}^{pre-DFT}/2 & PUCCH \text{ format 4 with } n_{oc} = 1 \end{cases} \quad \text{(Equation 8)}$$

If $N_{hop}^{pre-DFT}$ is four, $n_0$ is given by following equation 9:

$$n_0 = \begin{cases} 0 & PUCCH \text{ format 3} \\ 0 & PUCCH \text{ format 4 with } n_{oc} = 0 \\ N_{hop}^{pre-DFT}/4 & PUCCH \text{ format 4 with } n_{oc} = 1 \\ N_{hop}^{pre-DFT}*2/4 & PUCCH \text{ format 4 with } n_{oc} = 2 \\ N_{hop}^{pre-DFT}*3/4 & PUCCH \text{ format 4 with } n_{oc} = 3 \end{cases} \quad \text{(Equation 9)}$$

Equations 8 and 9 represent cases using the tables of FIGS. 6A and 6B of example 3-2.

In example 4-1 and example 4-2, $n_{oc}$ varies depending on $N_{hop}^{pre-DFT}$. If $N_{hop}^{pre-DFT}$ is two, $n_{oc}$ is one of $\{0, 1\}$. If $N_{hop}^{pre-DFT}$ is four, $n_{oc}$ is one of $\{0, 1, 2, 3\}$.

$N_{hop}^{pre-DFT}$ is the number of pre-DFT OCCs that can be used, and, for example, two or four.

The other variables are the same as in the second example.

The UE and the network (for example, a radio base station) determine CS indices that have been subjected to CS hopping, from pre-DFT OCC indices, by using the fourth example, so that a plurality of UEs can perform CS hopping by using varying CSs. Furthermore, by determining CS indices based on the pre-DFT OCC length or the maximum value of the pre-DFT OCC length, the number of CS indices can be kept at the pre-DFT OCC length or at the maximum value of the pre-DFT OCC length, and the interval between CSs can be secured. Also, as with the third example, it is possible to maximize the interval between the CS indices of two UEs that are multiplexed, so that the robustness against frequency-selective channels can be improved and the performance of PUCCH can be improved.

Fifth Example

In accordance with a fifth example of the present invention, initial CS indices are limited to $\{0, 3, 6, 9\}$, but the CS indices to actually use (that have been subjected to CS hopping) are not limited to $\{0, 3, 6, 9\}$.

For example, $\alpha_l$, which is the CS obtained by CS hopping, is given by following equation 10:

$$\alpha_l = \frac{2\pi}{N_{SC}^{RB}}(n_0 + (m_{cs} + n_{cs}(n_s, \; l+l')))\mod N_{SC}^{RB} \quad \text{(Equation (10))}$$

Here, $N_{SC}^{RB}$ is the number of subcarriers in one RB, and, for example, 12.

By removing $2\pi/N_{SC}^{RB}$ at the beginning of equation 10, equation 10 may represent CS index ($k_l$), instead of representing $\alpha_l$. In this case, $\alpha_l$ is $\{1, 2, \ldots, N_{SC}^{RB}-1\}$.

Example 5-1

$n_0$ is given by equation 11 below.

$$n_0 = \begin{cases} 0 & PUCCH \text{ format 3} \\ 0 & PUCCH \text{ format 4 with } n_{oc} = 0 \\ N_{SC}^{RB}/2 & PUCCH \text{ format 4 with } n_{oc} = 1 \\ N_{SC}^{RB}/4 & PUCCH \text{ format 4 with } n_{oc} = 2 \\ N_{SC}^{RB}*3/4 & PUCCH \text{ format 4 with } n_{oc} = 3 \end{cases} \quad \text{(Equation 11)}$$

Example 5-2

$n_0$ varies depending on $N_{hop}^{pre-DFT}$.

If $N_{hop}^{pre-DFT}$ is two, $n_0$ is given by following equation 12:

$$n_0 = \begin{cases} 0 & PUCCH \text{ format 3} \\ 0 & PUCCH \text{ format 4 with } n_{oc} = 0 \\ N_{SC}^{RB}/2 & PUCCH \text{ format 4 with } n_{oc} = 1 \end{cases} \quad \text{(Equation 12)}$$

If $N_{hop}^{pre-DFT}$ is four, $n_0$ is given by following equation 13:

$$n_0 = \begin{cases} 0 & PUCCH \text{ format 3} \\ 0 & PUCCH \text{ format 4 with } n_{oc} = 0 \\ N_{SC}^{RB}/4 & PUCCH \text{ format 4 with } n_{oc} = 1 \\ N_{SC}^{RB}*2/4 & PUCCH \text{ format 4 with } n_{oc} = 2 \\ N_{SC}^{RB}*3/4 & PUCCH \text{ format 4 with } n_{oc} = 3 \end{cases} \quad \text{(Equation 13)}$$

In example 5-1 and example 5-2, $n_{oc}$ varies depending on $N_{hop}^{pre-DFT}$. When $N_{hop}^{pre-DFT}$ is two, $n_{oc}$ is one of $\{0, 1\}$. When $N_{hop}^{pre-DFT}$ is four, $n_{oc}$ is one of $\{0, 1, 2, 3\}$.

The other variables are the same as in the second example.

Many CS candidates can be used compared to the case where the CS indices for actual use are limited to $\{0, 3, 6, 9\}$. For example, inter-cell interference can be suppressed by using CS indices $\{0, 3, 6, 9\}$ in a given cell and using CS indices $\{1, 4, 7, 10\}$ in another cell.

Other Examples

The CS indices in FIG. 2 to FIG. 6 start from 0, but may start from any of 3, 6, and 9. For example, a shift of either 3, 6 or 9 may be applied to four or two CS indices in FIG. 2 to FIG. 6 (by applying any rotation of $\pi/2$, $\pi$ and $3\pi/2$ to CS), four or two CSs may be inverted, or the order of four or two CS indices may be reversed.

For example, initial CS indices 0 and 6 in FIG. 3A may be shifted through 3, and provide 3 and 9. For example, initial CS indices 0, 6, 3 and 9 in FIG. 2B may be shifted through 6, and provide 6, 0, 9 and 3. For example, CS indices 0 and 6 in FIG. 6A may be shifted through 9 and provide 9 and 3. For example, CS indices 0, 6, 3 and 9 in FIG. 5A may be set to 0, 6, 9 and 3 by inverting CS.

(Radio Communication System)

Now, the structure of a radio communication system according to the present embodiment will be described below. In this radio communication system, each radio communication method according to the above-described embodiments is employed. Note that the radio communication methods according to the herein-contained aspects of the present invention may be applied individually, or two or more of them may be combined and applied.

Figure 7:
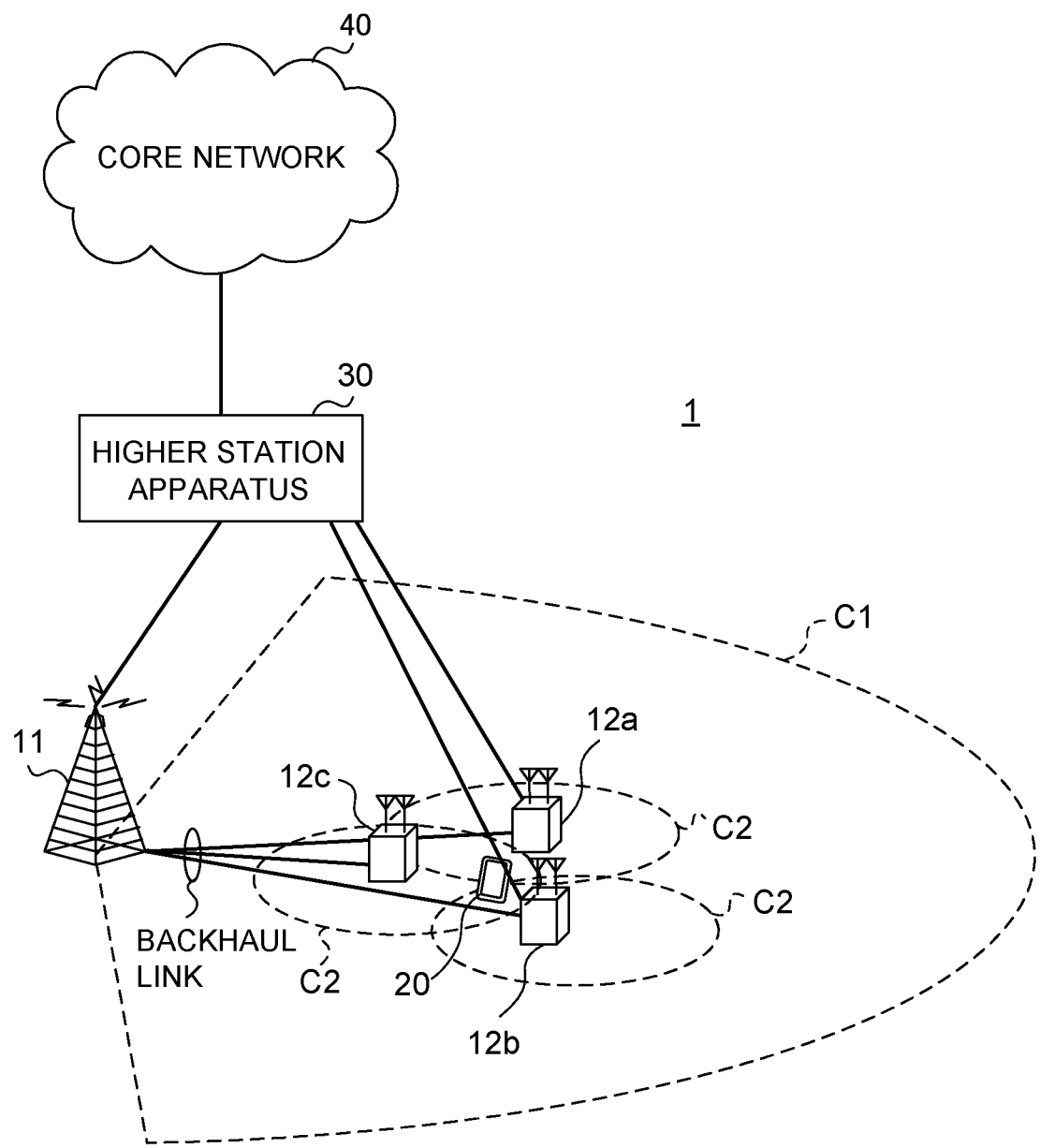
FIG. 7 is a diagram to show an example of a schematic structure of a radio communication system according to the present embodiment.

FIG. 7 is a diagram to show an example of a schematic structure of a radio communication system according to present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame configuration, the filtering process, the windowing process, and so on). In the radio communication system 1, for example, subcarrier spacing of, for example, 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points (TRPs)" and so on. Hereinafter the radio base stations 11 and 12 will be collectively referred to as "radio base stations 10," unless specified otherwise.

The user terminals 20 are terminals to support various communication schemes such as LTE, LTE-A, 5G, NR and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Also, in the radio communication system 1, a multi-carrier waveform (for example, the OFDM waveform) may be used, or a single-carrier waveform (for example, the DFT-s-OFDM waveform) may be used.

In the radio communication system 1, a DL shared channel (PDSCH (Physical Downlink Shared CHannel)), which is used by each user terminal 20 on a shared basis, a broadcast channel (PBCH (Physical Broadcast CHannel)), L1/L2 control channels and so on are used as downlink (DL) channels. User data, higher layer control information and SIBs (System Information Blocks) are communicated in the PDSCH. Also, the MIB (Master Information Block) is communicated in the PBCH.

The L1/L2 control channels include a downlink control channel (PDCCH (Physical Downlink Control CHannel)), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ retransmission control information (ACK/NACK) in response to the PUSCH using at least one of the PHICH, the PDCCH and the EPDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink (UL) channels. User data, higher layer control information and so on are communicated by the PUSCH. Uplink control information (UCI), including at least one of downlink (DL) signal retransmission control information (A/N), channel state information (CSI) and so on, is communicated in the PUSCH or the PUCCH. By means of the PRACH, random access preambles for establishing connections with cells are communicated.

<Radio Base Station>

Figure 8:
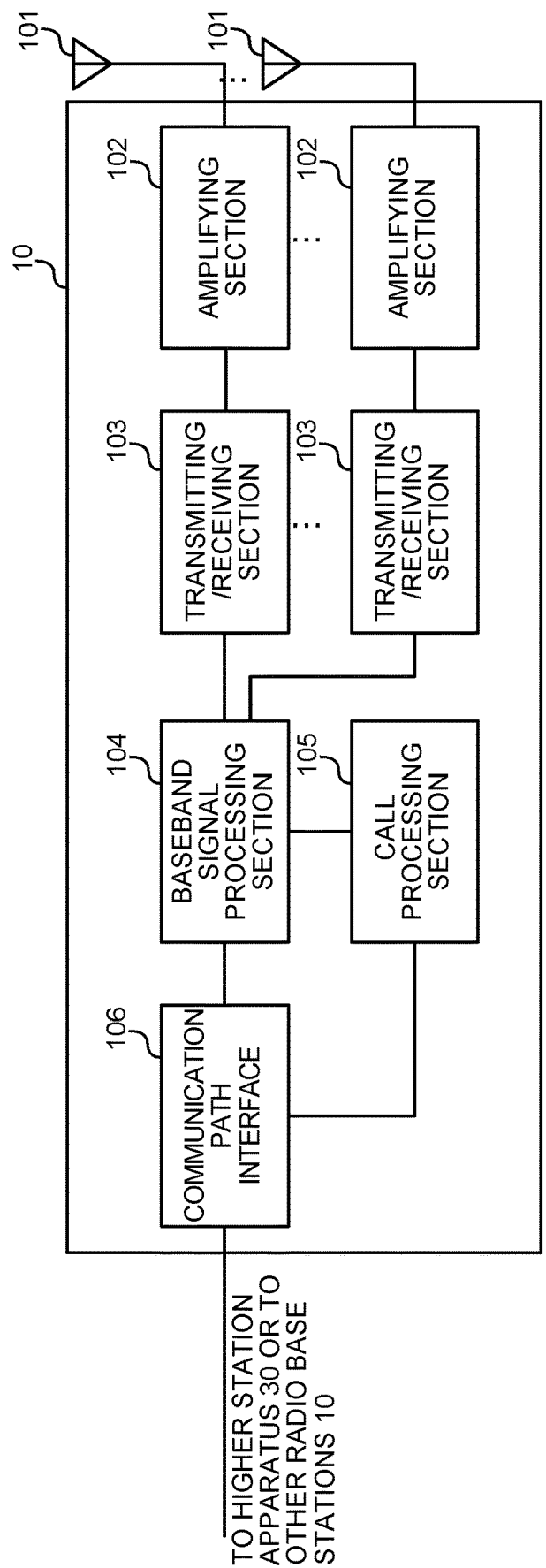
FIG. 8 is a diagram to show an example of an overall structure of a radio base station according to the present embodiment.

FIG. 8 is a diagram to show an example of an overall structure of a radio base station according to present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink (UL) signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a given interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit downlink (DL) signals (including at least one of a DL data signal, a DL control signal and a DL reference signal) to the user terminal 20, and receive uplink (UL) signals (including at least one of a UL data signal, a UL control signal and a UL reference signal) from the user terminal 20.

Furthermore, the transmitting/receiving sections 103 receive UCI from the user terminal 20 via an uplink data channel (for example, a PUSCH) or uplink control channel (for example, a short PUCCH and/or a long PUCCH). This UCI may include at least one of HARQ-ACK in response to a downlink data channel (for example, a PDSCH), CSI, SR, beam identifying information (for example, beam index (BI)) and a buffer status report (BSR).

In addition, the transmitting/receiving sections 103 transmit control information (higher layer control information) via higher layer signaling and downlink control information (DCI) via physical layer signaling. To be more specific, the transmitting/receiving section 103 may transmit at least one of configuration information indicating PUCCH resources, information indicating the PUCCH format and/or duration, information indicating the location where the long PUCCH starts (starting symbol) by physical layer signaling (L1 signaling) and/or higher layer signaling.

Figure 9:
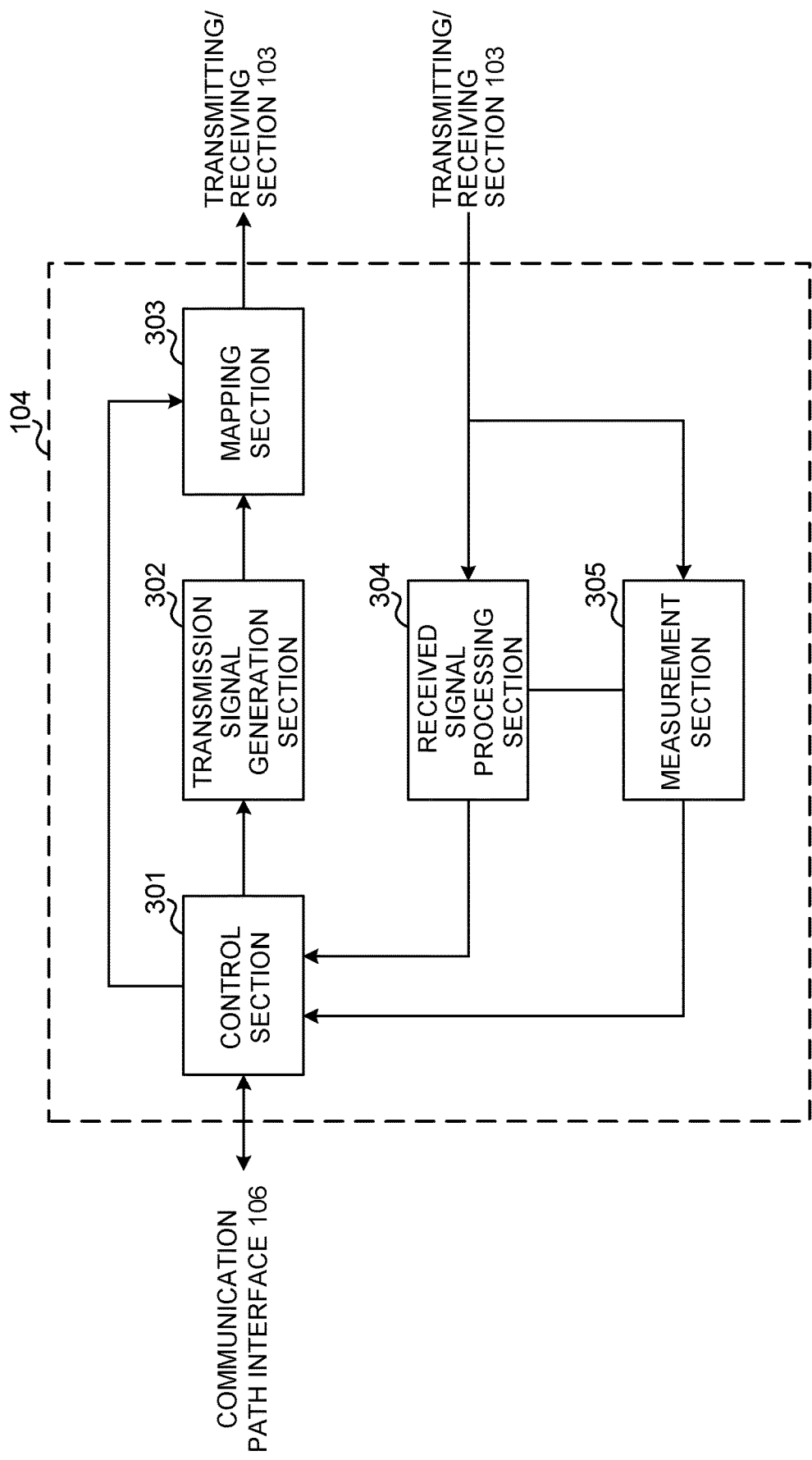
FIG. 9 is a diagram to show an example of a functional structure of a radio base station according to the present embodiment.

FIG. 9 is a diagram to show an example of a functional structure of a radio base station according to present embodiment. Note that, although this example will primarily show functional blocks that pertain to characteristic parts of the present embodiment, the radio base station 10 has other functional blocks that are necessary for radio communication as well. As shown in this drawing, the baseband signal processing section 104 at least has a control section (scheduler) 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving process (for example, demodulation) for UL signals by the received signal processing section 304 and the measurements by the measurement section 305.

Furthermore, the control section 301 may control the format of uplink control channels (for example, a long PUCCH and/or a short PUCCH) so that control information related to the uplink control channels is transmitted.

In addition, the control section 301 may control PUCCH resources.

The control section 301 may control the received signal processing section 304 to perform the receiving process for UCI from the user terminal 20 in accordance with the format of uplink control channels.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to given radio resources based on commands from the control section 301, and outputs these to the transmitting/receiving sections 103. For the mapping section 303, a mapper, a mapping circuit or mapping apparatus that can be described based on general understanding of the technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may outputs the received signals, the signals after the receiving processes and so on, to the measurement section 305. In addition, the received signal processing section 304 performs UCI receiving processes based on the uplink control channel format commanded from the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 10:
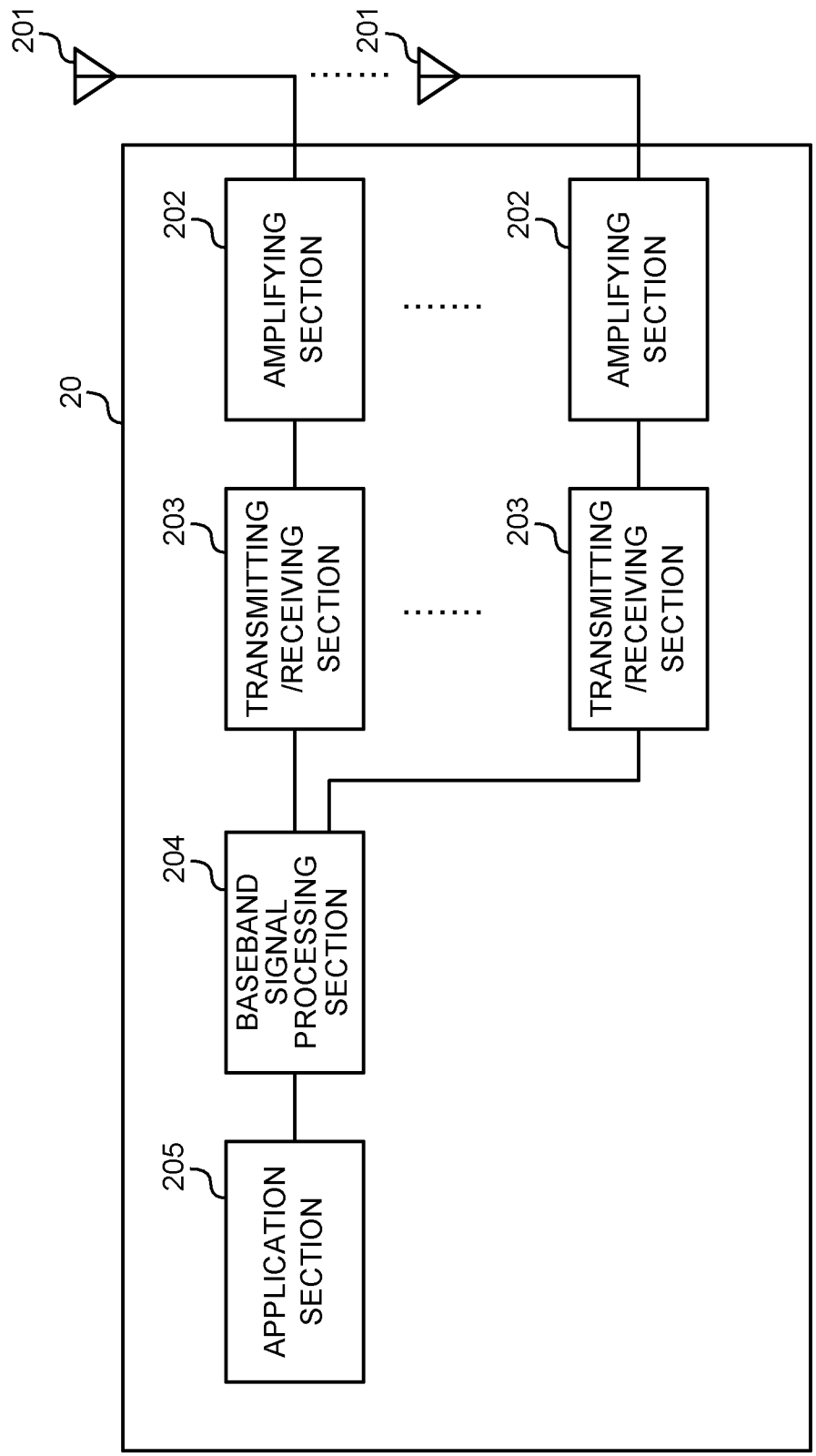
FIG. 10 is a diagram to show an example of an overall structure of a user terminal according to the present embodiment.

FIG. 10 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, uplink (UL) data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. The UCI is also subjected to at least one of channel coding, rate matching, puncturing, a DFT process and an IFFT process, and the result is forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive downlink (DL) signals (including DL data signals, DL control signals, DL reference signals, etc.) of the numerology configured in the user terminal 20, and transmit UL signals (including UL data signals, UL control signals, UL reference signals, etc.) of the numerology.

In addition, the transmitting/receiving sections 203 transmit UCI to the radio base station 10 using an uplink data channel (for example, a PUSCH) or an uplink control channel (for example, a short PUCCH and/or a long PUCCH).

In addition, the transmitting/receiving sections 203 receives control information (higher layer control information) via higher layer signaling and downlink control information (DCI) via physical layer signaling.

Also, the transmitting/receiving sections 203 may transmit an uplink control channel (for example, a PUCCH) including data to which orthogonal cover code (for example, pre-DFT OCC) is applied prior to the discrete Fourier transform, and a demodulation reference signal (for example, DMRS) to which cyclic shift (CS) is applied.

Also, the transmitting/receiving sections 203 may receive information to represent PUCCH resources, information to represent the pre-DFT OCC index and information to represent the pre-DFT OCC length.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 11:
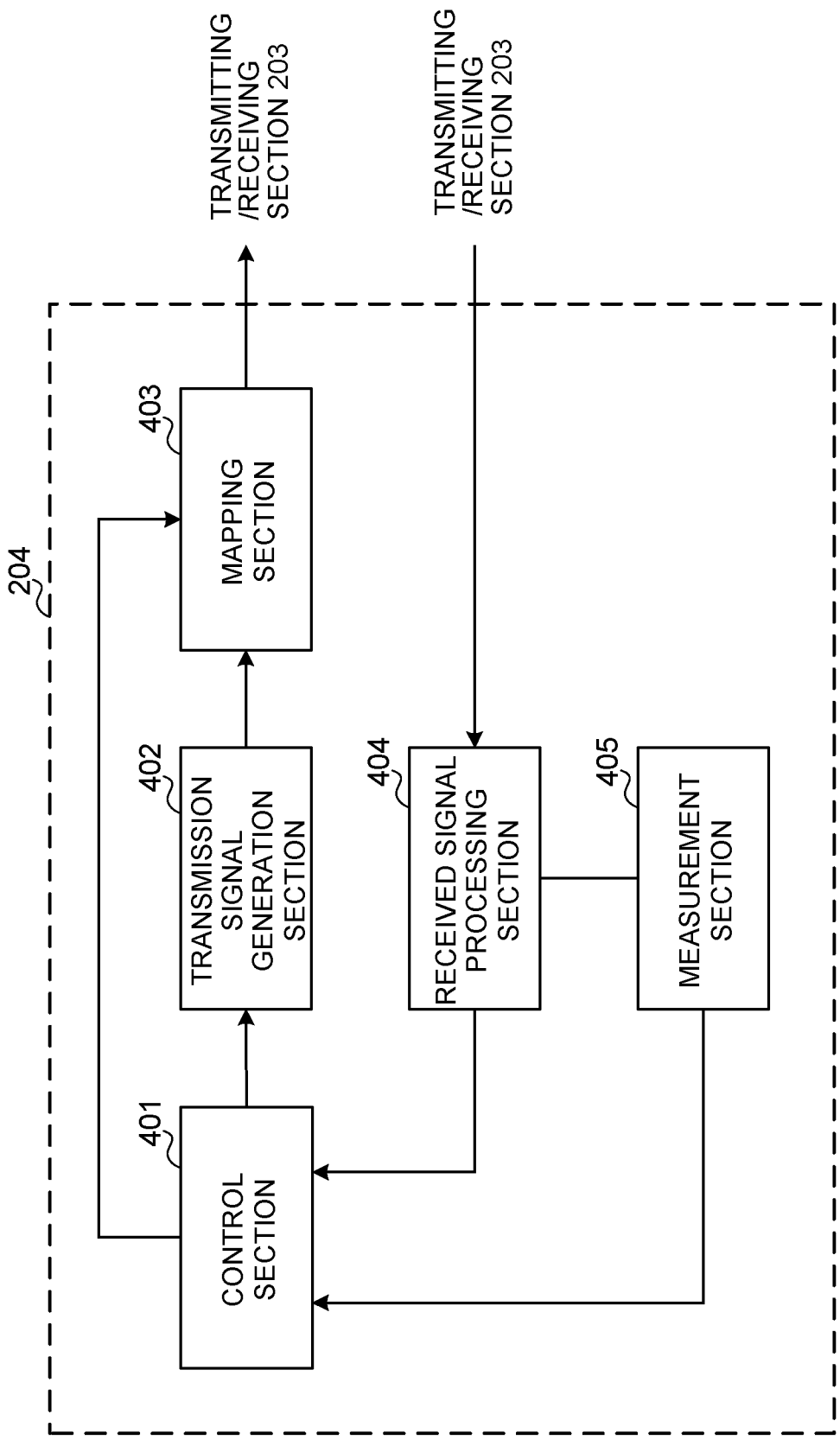
FIG. 11 is a diagram to show an example of a functional structure of a user terminal according to the present embodiment.

FIG. 11 is a diagram to show an example of a functional structure of a user terminal according to present embodiment. Note that, although this diagram will primarily show functional blocks that pertain to characteristic parts of present embodiment, the user terminal 20 has other functional blocks that are necessary for radio communication as well. As shown in this drawing, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

Furthermore, the control section 401 controls the uplink control channel use to transmit UCI from the user terminal 20, based on explicit commands from the radio base station 10 or implicit decisions in the user terminal 20.

Furthermore, the control section 401 may control the format of uplink control channels (for example, a long PUCCH and/or a short PUCCH). The control section 401 may control the format of this uplink control channel based on control information from the radio base station 10.

Also, the control section 401 may determine the PUCCH resources to use in PUCCH formats based on higher layer signaling and/or downlink control information.

The control section 401 may control at least one of the transmission signal generation section 402, the mapping section 403 and the transmitting/receiving sections 203 to perform UCI transmission processes based on PUCCH formats.

In addition, the control section 401 may perform control so that cyclic shift (for example, $\alpha_l$) is determined based on the index of orthogonal cover code, the time resource of the demodulation reference signal (for example, the slot number and the symbol number), and the length of orthogonal cover code (for example, 2 or 4) or the maximum value of this length (for example, 4).

In addition, the control section 401 may determine the cyclic shift to apply, using the remainder of a number, which is based on the index of a cyclic shift that is associated with the index of the orthogonal cover code, and the slot number and the symbol number of the demodulation reference signal, divided by the length of the orthogonal cover code or the maximum value of the length (second example).

In addition, the control section 401 may determine the cyclic shift to apply, using the remainder of a number, which is based on the index of the orthogonal cover code and the slot number and the symbol number of the demodulation reference signal, divided by the length of the orthogonal cover code or the maximum value of the length (third example).

Also, the cyclic shift is one of a plurality of candidates, and the number of the plurality of candidates may be the length of orthogonal cover code or the maximum value of this length.

Also, the interval between the plurality of candidates may be the maximum value.

The control section 401 can be constituted by a controller, a control circuit or control apparatus that can be described based on general understanding of the technical field to which the present invention pertains.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 12:
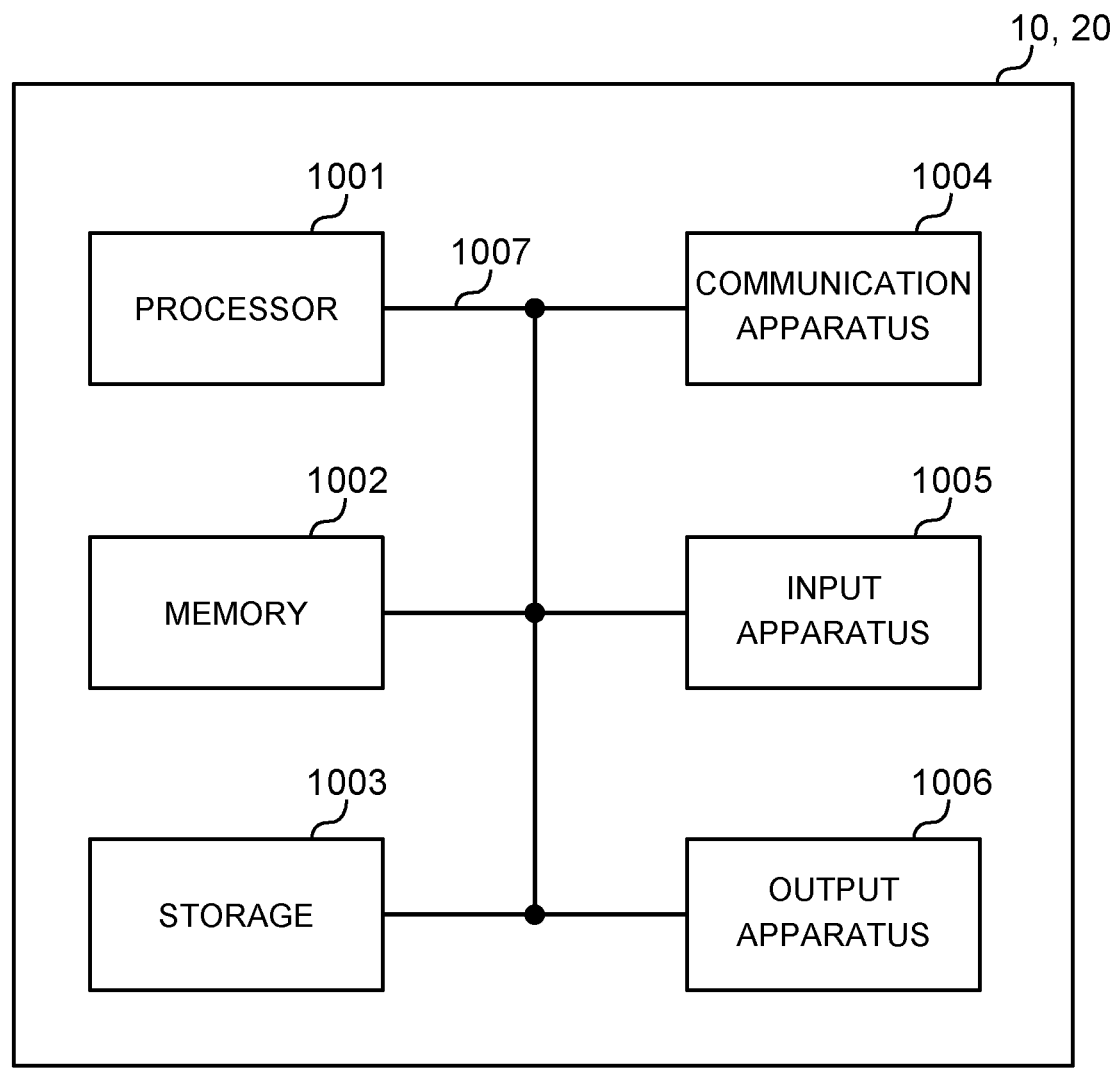
FIG. 12 is a diagram to show an example of a hardware structure of a radio base station and a user terminal according to the present embodiment.

For example, the radio base station, user terminals and so on according to embodiments of the present invention may function as a computer that executes the processes of the radio communication method of the present invention. FIG. 12 is a diagram to show an example hardware structure of a radio base station and a user terminal according to present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations) Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Signaling of information is by no means limited to the aspects/embodiments described in this specification, and other methods may be used as well. For example, signaling of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be signaled using, for example, MAC control elements (MAC CEs (Control Elements)).

Also, signaling of given information (for example, signaling of information to the effect that "X holds") does not necessarily have to be sent explicitly, and can be sent implicitly (for example, by not signaling this piece of information, by signaling another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "transmission/reception point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

A base station and/or a mobile station may be referred to as "transmitting apparatus," "receiving apparatus," and the like.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives an orthogonal cover code index by a higher layer,
   a processor that determines a cyclic shift index based on the orthogonal cover code index and determines a cyclic shift based on the cyclic shift index; and
   a transmitter that transmits:
      on an uplink control channel, uplink control information to which an orthogonal cover code associated with the orthogonal cover code index is applied; and
      within a resource block assigned for the uplink control channel, a demodulation reference signal using a reference signal sequence having the cyclic shift,
   wherein when a length of the orthogonal cover code is 2, values 0 and 1 of the orthogonal cover code index are respectively associated with values 0 and 6 of the cyclic shift index, and
   wherein when a length of the orthogonal cover code is 4, values 0, 1, 2, and 3 of the orthogonal cover code index are respectively associated with values 0, 6, 3, and 9 of the cyclic shift index.

2. The terminal according to claim 1, wherein the processor controls the cyclic shift based on a function of a slot number and a symbol number of the demodulation reference signal.

3. The terminal according to claim 1, wherein the processor controls the cyclic shift based on a length of the orthogonal cover code associated with the orthogonal cover code index.

4. A radio control method for a terminal, the method comprising:
   receiving an orthogonal cover code index by a higher layer,
   determining a cyclic shift index based on the orthogonal cover code index;
   determining a cyclic shift based on the cyclic shift index;
   transmitting, on an uplink control channel, uplink control information to which an orthogonal cover code associated with the orthogonal cover code index is applied; and
   transmitting, within a resource block assigned for the uplink control channel, a demodulation reference signal using a reference signal sequence having the cyclic shift,
   wherein when a length of the orthogonal cover code is 2, values 0 and 1 of the orthogonal cover code index are respectively associated with values 0 and 6 of the cyclic shift index, and
   wherein when a length of the orthogonal cover code is 4, values 0, 1, 2, and 3 of the orthogonal cover code index are respectively associated with values 0, 6, 3, and 9 of the cyclic shift index.

5. A base station comprising:
   a processor that configures an orthogonal cover code index by a higher layer; and
   a receiver that receives:
      on an uplink control channel, uplink control information to which an orthogonal cover code associated with the orthogonal cover code index configured by the higher layer is applied; and
      within a resource block assigned for the uplink control channel, a demodulation reference signal using a reference signal sequence having a cyclic shift based on a cyclic shift index,
   wherein the cyclic shift index is based on the orthogonal cover code index,
   wherein the cyclic shift is based on the cyclic shift index,
   wherein when a length of the orthogonal cover code is 2, values 0 and 1 of the orthogonal cover code index are respectively associated with values 0 and 6 of the cyclic shift index, and
   wherein when a length of the orthogonal cover code is 4, values 0, 1, 2, and 3 of the orthogonal cover code index are respectively associated with values 0, 6, 3, and 9 of the cyclic shift index.

6. A system comprising a terminal and a base station, wherein
   the terminal comprises:
      a receiver that receives an orthogonal cover code index by a higher layer,
      a processor of the terminal that determines a cyclic shift index based on the orthogonal cover code index and determines a cyclic shift based on the cyclic shift index; and
      a transmitter that transmits:
         on an uplink control channel, uplink control information to which an orthogonal cover code associated with the orthogonal cover code index is applied; and
         within a resource block assigned for the uplink control channel, a demodulation reference signal using a reference signal sequence having the cyclic shift,
      wherein when a length of the orthogonal cover code is 2, values 0 and 1 of the orthogonal cover code index are respectively associated with values 0 and 6 of the cyclic shift index, and
      wherein when a length of the orthogonal cover code is 4, values 0, 1, 2, and 3 of the orthogonal cover code index are respectively associated with values 0, 6, 3, and 9 of the cyclic shift index,
   the base station comprises:
      a processor of the base station that configures the orthogonal cover code index; and
      a receiver that receives:
         on the uplink control channel, the uplink control information; and
         within the resource block assigned for the uplink control channel, the demodulation reference signal.

* * * * *